(12) United States Patent
Sutardja et al.

(10) Patent No.: US 7,839,739 B2
(45) Date of Patent: Nov. 23, 2010

(54) CIRCUITS, ARCHITECTURES, APPARATUSES, SYSTEMS, ALGORITHMS AND METHODS AND SOFTWARE FOR OPTIMUM POWER CALIBRATION FOR OPTICAL DISC RECORDING

(75) Inventors: Pantas Sutardja, Los Gatos, CA (US); William R. Foland, Jr., Littleton, CO (US)

(73) Assignee: Marvell World Trade Ltd., St. Michael (BB)

( * ) Notice: Subject to any disclaimer, the term of this patent is extended or adjusted under 35 U.S.C. 154(b) by 1001 days.

(21) Appl. No.: 11/646,098

(22) Filed: Dec. 26, 2006

(65) Prior Publication Data

US 2007/0201331 A1 Aug. 30, 2007

Related U.S. Application Data

(60) Provisional application No. 60/776,588, filed on Feb. 24, 2006.

(51) Int. Cl.
G11B 15/52 (2006.01)
(52) U.S. Cl. .................................. 369/47.53
(58) Field of Classification Search ................ None
See application file for complete search history.

(56) References Cited

U.S. PATENT DOCUMENTS 5,969,649 A * 10/1999 Ashley et al. ................. 341/59
6,891,565 B1 * 5/2005 Dieterich .................... 348/180
6,975,572 B2 * 12/2005 Matsumoto .............. 369/47.53

OTHER PUBLICATIONS

Korean Office Action dated Jun. 21, 2010; Korean Patent Application No. 10-2008-7022833; Korean Intellectual Property Office, Republic of Korea.

* cited by examiner

*Primary Examiner*—Joseph H Feild
*Assistant Examiner*—Tawfik Goma

(57) ABSTRACT

Methods, software, and apparatus for the calibration of writing characteristics for writing to an optical storage medium, and methods of encoding calibration pattern data and calibration instructions are disclosed. The method of calibration generally includes the steps of (a) receiving pattern data and instructions synchronized with the pattern data, (b) writing the pattern data to the optical storage medium in accordance with the instructions, (c) reading a readback signal corresponding to the pattern data from the optical storage medium, (d) processing the readback signal in accordance with the instructions, and (e) determining a value of a writing characteristic for writing data to the optical storage medium based at least in part on the readback signal. The method provides the ability to flexibly set test parameters and to quickly and accurately test the write characteristics of a recordable or re-writable optical storage medium.

49 Claims, 8 Drawing Sheets

CIRCUITS, ARCHITECTURES, APPARATUSES, SYSTEMS, ALGORITHMS AND METHODS AND SOFTWARE FOR OPTIMUM POWER CALIBRATION FOR OPTICAL DISC RECORDING

RELATED APPLICATIONS

This application claims the benefit of U.S. Provisional Application No. 60/776,588, filed Feb. 24, 2006, incorporated herein by reference in its entirety.

FIELD OF THE INVENTION

The present invention generally relates to the field of writing to an optical storage medium. More specifically, embodiments of the present invention pertain to methods and apparatus for calibration of optimal writing characteristics for optical storage media.

DISCUSSION OF THE BACKGROUND

Optical storage technology comprises a wide and growing variety of disc and application specifications. Disc specifications include, for example, CD-ROM and DVD-ROM for pre-recorded discs, CD-R, DVD-R, and DVD+R for write-once discs, and CD-RW, DVD-RW, DVD-RAM, and DVD+RW for rewritable discs. The disc format specifications generally define the physical characteristics of the disc (e.g., mechanical properties, optical signal characteristics, physical arrangement, writing methods, and testing conditions). Application specifications include DVD-Video for video content, DVD-Audio for audio content, and DVD-VR and DVD+VR for real-time video recording (e.g., in camcorders and personal video recorders [PVRs]).

In many optical disc specifications, an optical disc may comprise two areas, including a user data area and a disc information (lead-in) area. The user data area is generally used to write application data, including video, audio, information tables, file system data, etc. The disc information (lead-in) area generally includes data such as disc size, disc type, disc layout, etc. In some optical disc specifications (e.g., CD-R, DVD-R and DVD+R), the disc generally can be written only once. In other disc specifications or formats (e.g., CD-R/W, DVD+RW), data may be written to the disc more than once.

Optical storage media generally store data as a sequence (e.g., a continuous track) of "pits" (or "marks") and "lands" (or "space") on a data-bearing surface that is made reflective by the application of a metallic layer during manufacture. The "lands" are generally parts of the track that are not pits. Pits in read-only storage media are generally molded into the data bearing surface when the discs are formed. Recordable and re-writable discs are generally produced as blanks, and have only a preformed groove or "pre-groove" (together with a limited amount of embossed data in most cases) included during molding. Data is stored on recordable or re-writable optical storage media using the same pit-land principle, however the pits are generally added by "burning" a special phase-change material layer applied to the disc substrate. In order to write to a recordable or re-writable disc, an optical pick-up head of an optical disc is generally equipped with a higher power write laser in addition to the read laser. Alternatively, one laser can generally perform both functions by operating at lower power output for read operations, and a range of higher power outputs for write operations.

The amount of power used to burn pit features is critical to the shape of those features. The geometry of the shape of the pit features affects the read-back performance of read-back systems. Recordable and re-writable optical storage media are produced by a wide variety of vendors using different materials. Thus, an appropriate writing power level for one medium may be too high or too low for another medium, even if both media are manufactured in accordance with the same specification. Therefore, most optical storage medium specifications include some facility for a vendor to specify an optimal power level. However, even the vendor specified power level may be suboptimal due to normal process variations in the medium and/or the recording device or operational variations in the recording device. Therefore, most optical storage medium specifications also define one or more areas of the media for performing optimal power calibration (OPC) by writing data at various power levels and read back the data to determine an optimal writing power level. The amount of space available for OPC operations may be limited, and the OPC operations may need to be run multiple times if data is written to the medium in multiple sessions and/or on using multiple different recording devices on the same medium. Consequently, it is desirable for optical storage medium recording devices to obtain the most accurate calibration data using as little space in the OPC area as possible.

In optical storage media, everyday handling damage, such as dust, fingerprints, and tiny scratches, may affect retrieved data and disrupt the functionality of a recording or playback device. Specific sequences of pits and lands are particularly susceptible to defects in the medium, and playability can be improved if such sequences are barred from recording. Various encoding methods are used in optical media to avoid this problem. For example, run length limited (RLL) codes are generally used, wherein the spectrum (power density function) of the encoded sequence vanishes at the low-frequency end, and both the minimum and maximum number of consecutive bits of the same kind are within specified bounds (or constraints).

In the compact disc (CD) standard, data is encoded using eight-to-fourteen modulation (EFM). Under EFM rules, the data to be stored is first broken into 8-bit blocks (bytes). Each 8-bit block is translated into a corresponding 14-bit codeword using a lookup table. The 14-bit codewords are chosen such that binary ones are always separated by a minimum of two binary zeroes and a maximum of ten binary zeroes. This is because a binary one is stored on the disc as a change from a land to a pit or a pit to a land, while a binary zero is indicated by no change. Because EFM ensures there are at least two zeroes between every two ones, it also ensures that every sequence of adjacent pit and land features is at least three clock cycles long. This reduces the demands on the optical pickup used in the playback mechanism. The ten consecutive-zero maximum ensures worst-case clock recovery in the player. EFM generally requires 3 merging bits between adjacent 14-bit codewords to ensure that consecutive codewords do not violate the specified minimum and maximum run-length constraint. Thus, 17 bits of disk space are generally needed to encode 8 bits of data.

Figure 1:
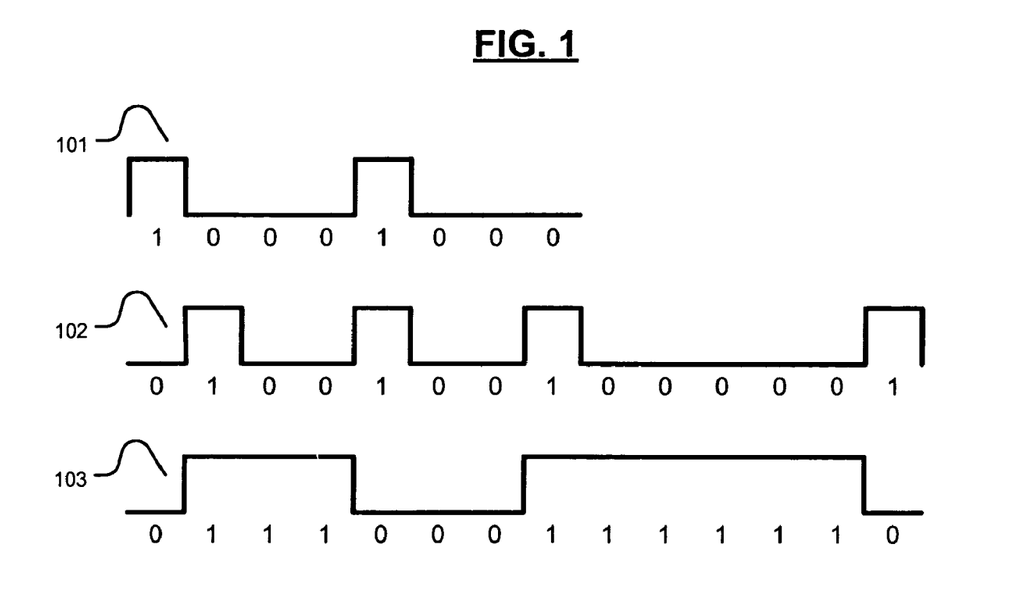
FIG. 1 shows conventional EFM encoding of exemplary data.

Referring now to FIG. 1, three binary sequences are shown. Binary sequence 101 represents the number 136 (e.g., "10001000" in an eight-bit binary code). Binary sequence 102 represents an EFM code for the same byte of data (e.g., "01001001000001"). Binary sequence 103 represents the same EFM code, except that a "1" in binary sequence 102 is represented in binary sequence 103 as a transition between a "1" and a "0" or between a "0" and a "1," corresponding to the pit and land transitions to be written to disc (e.g., "0111000111111110"). It will be recognized that, using the encoding of FIG. 1C under the EFM constraints, there will never be a valid sequence of fewer than three "1"s or "0"s (after accounting for the merging bits before and/or after the EFM codeword). It will also be recognized that, while this encoding method is very valuable for avoiding errors in the optical storage medium, it also contains some overhead and/or redundant (e.g., non-information) data.

Similar run length limited codes are specified for other optical media. For example, DVDs are generally encoded using EFMPlus, which requires fewer packing bits than EFM encoding. The Blu-ray Disc (BD) and HD-DVD standards also specify encoding methods to be used on those media.

In order to perform OPC, pattern data (e.g., EFM or similarly encoded data) is generally written to an OPC area of the optical storage medium. This pattern data may be stored in random access memory (RAM), nonvolatile memory such as flash memory or electrically erasable and programmable read only memory (EEPROM), and/or other suitable electronic data storage (e.g., if OPC is performed more than once). Therefore, it is also desirable to minimize the amount of electronic data storage required to store pattern data (e.g., by taking advantage of the redundancy inherent in the encoded data).

SUMMARY OF THE INVENTION

Embodiments of the present invention relate to methods, software, and apparatus for the calibration of writing characteristics for writing to an optical storage medium, and methods of encoding calibration pattern data and calibration instructions. The method for calibration generally includes the steps of (a) receiving pattern data and instructions synchronized with the pattern data, (b) writing the pattern data to the optical storage medium in accordance with the instructions, (c) reading a readback signal corresponding to the pattern data from the optical storage medium, (d) processing the readback signal in accordance with the instructions, and (e) determining a value of a writing characteristic for writing data to the optical storage medium based at least in part on the readback signal.

The apparatus may comprise (a) a memory configured to produce a calibration bitstream, (b) a decoding module configured to extract calibration pattern data and calibration instructions synchronized with the calibration pattern data from the calibration bitstream, (c) a writing module configured to write the calibration pattern data to the optical storage medium in accordance with the calibration instructions, (d) a reading module configured to read a readback signal corresponding to the calibration pattern data from the optical storage medium, and (e) a processing module configured to process the readback signal in accordance with the calibration instructions and determine an optimal value of a writing characteristic for the optical storage medium based at least in part on the readback signal.

In the method for encoding, at least one of the instructions generally comprises an instruction for setting a test value for the writing characteristic. The method generally includes the steps (a) encoding the pattern data according to a run length limited (RLL) constraint, and (b) producing a bitstream comprising the pattern data and the instructions, wherein the step of producing comprises encoding the instructions in violation of the constraint.

The present invention advantageously provides the ability to flexibly set test parameters and to quickly and accurately test the write characteristics of a recordable or re-writable optical storage medium. These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "bitstream," "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The present invention concerns methods, software, and apparatus for calibrating characteristics for writing to an optical storage medium, and methods of encoding calibration pattern data and calibration instructions. The method of calibrating generally includes the steps of (a) receiving pattern data and instructions synchronized with the pattern data, (b) writing the pattern data to the optical storage medium in accordance with the instructions, (c) reading a readback signal corresponding to the pattern data from the optical storage medium, (d) processing the readback signal in accordance with the instructions, and (e) determining a value of a writing characteristic for writing data to the optical storage medium based at least in part on the readback signal.

A further aspect of the invention concerns an encoding method, generally including the steps (a) encoding the pattern data according to a run length limited (RLL) constraint, and (b) producing a bitstream comprising the pattern data and the instructions, wherein at least one of the instructions includes an instruction for setting a test value for the writing characteristic, and the step of producing comprises encoding the instructions in violation of the constraint. The algorithm(s) and/or software are generally configured to implement a method according to the present invention and/or any process or sequence of steps embodying the inventive concepts described herein.

The apparatus may comprise (a) a memory configured to produce a calibration bitstream, (b) a decoding module configured to extract calibration pattern data and calibration instructions synchronized with the calibration pattern data from the calibration bitstream, (c) a writing module configured to write the calibration pattern data to the optical storage medium in accordance with the calibration instructions, (d) a reading module configured to read a readback signal corresponding to the calibration pattern data from the optical storage medium, and (e) a processing module configured to process the readback signal in accordance with the calibration instructions and determine an optimal value of a writing characteristic for the optical storage medium based at least in part on the readback signal. The apparatus may comprise a circuit, architecture, system, or other hardware implementation. For example, the architecture may comprise any circuit or plurality of circuits embodying the inventive concepts described herein, such as an assembly of circuits or circuit blocks implementing the present apparatus.

The invention, in its various aspects, will be explained in greater detail below with regard to exemplary embodiments.

An Exemplary Method of Calibration

The present invention relates to a method of calibration for writing to an optical storage medium. The method generally includes the steps of (a) receiving pattern data and instructions synchronized with the pattern data, (b) writing the pattern data to the optical storage medium in accordance with the instructions, (c) reading a readback signal corresponding to the pattern data from the optical storage medium, (d) processing the readback signal in accordance with the instructions, and (e) determining a value of a writing characteristic for writing data to the optical storage medium based at least in part on the readback signal. In various embodiments, the optical storage medium may comprise an optical disc such as a write-once optical disc (e.g., a CD-R, DVD-R, or DVD+R) or a rewritable optical disc (e.g., a DVD-RW, DVD+RW, or DVD-RAM).

In a further embodiment, the receiving step may include the step of receiving a bitstream that comprises the instructions and the pattern data. The instructions may be superimposed on the pattern data in this bitstream. In a further embodiment, the pattern data may conform to a run length limited constraint, and the bitstream may comprise the instructions encoded in violation of the run length constraint (see, e.g., encoded bitstream 200 of FIG. 2A, discussed in detail below). Thus, the receiving step may further include extracting the pattern data and the instructions from the bitstream. The pattern data may, for example, comprise eight-to-fourteen modulation (EFM) encoded data or data that otherwise conforms to the encoding standards of the optical storage medium.

Figure 2A:
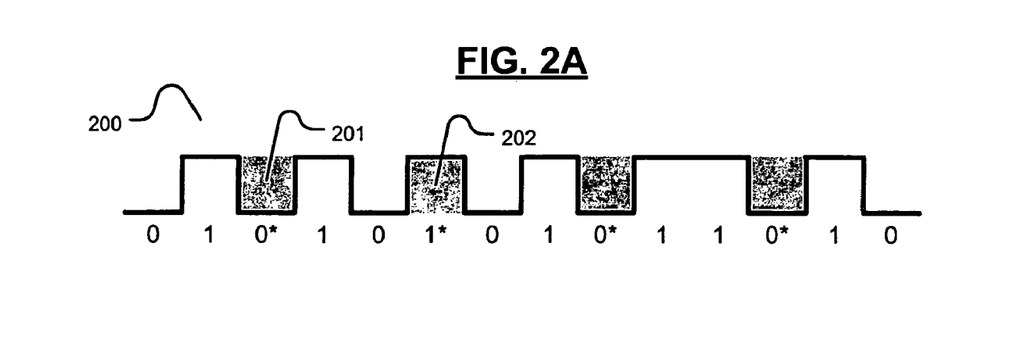
FIG. 2A is a diagram showing an exemplary pattern data and instruction encoding according to the present invention.
Figure 2B:
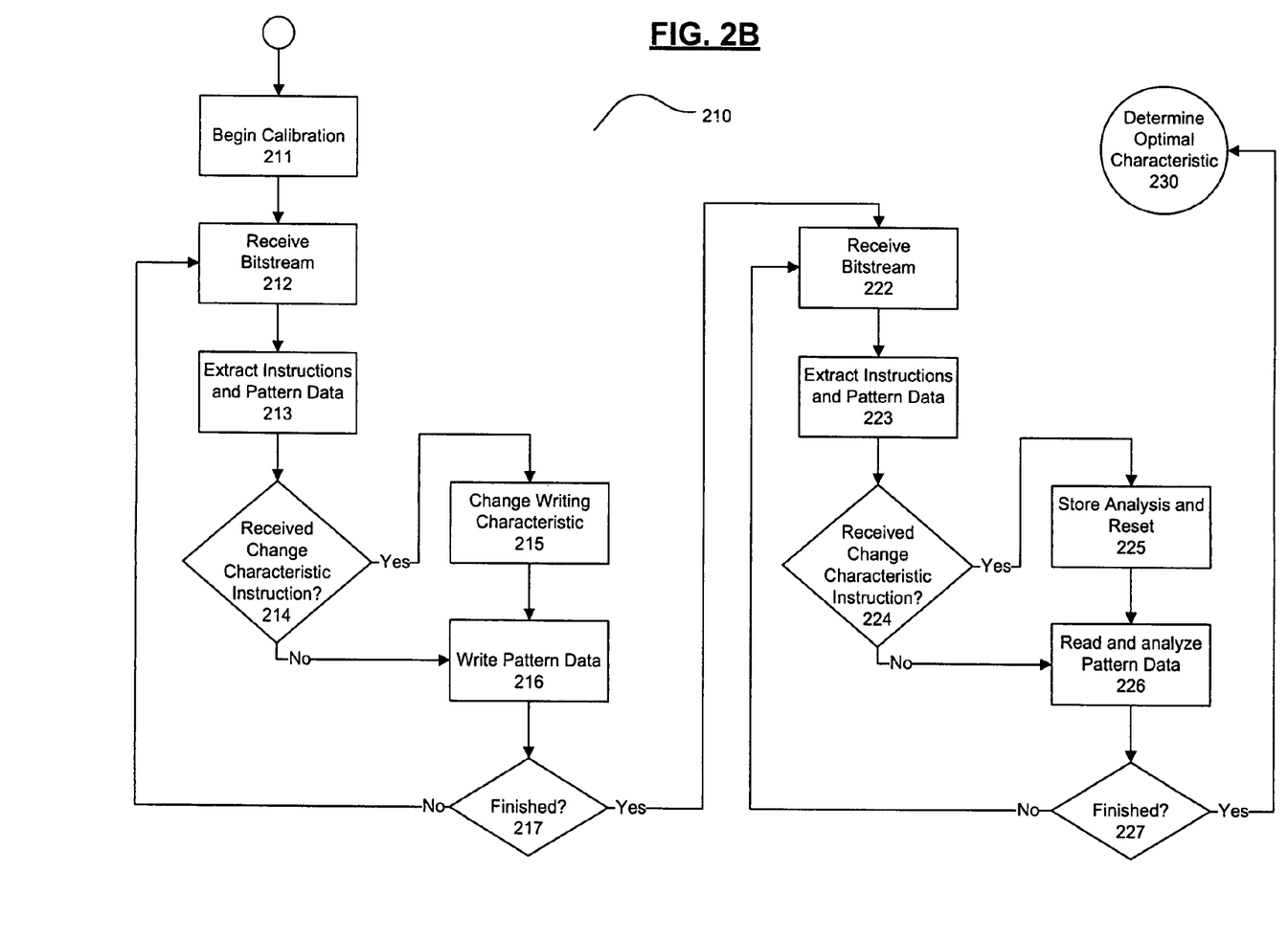
FIG. 2B is a flowchart of an exemplary method according to the present invention.

Referring now to FIG. 2B, a flowchart of an exemplary method according to the present invention is shown. Calibration begins at step 211. At step 212, one or more segments (e.g., one or more codewords and merging bits) of a calibration bitstream containing both calibration pattern data and calibration instructions may be received (e.g., retrieved from a memory module or otherwise retrieved from a data storage device). Step 213 comprises extracting instructions and pattern data from the bitstream. The instructions are advantageously synchronized with the pattern data. Optionally, the pattern data are also corrected at this point.

At step 214, the instructions are checked to determine whether the test writing characteristics should be changed before writing the corresponding pattern data to the optical storage medium. If so, the test writing characteristic is changed at step 215. In either case, at step 216 the next block of pattern data may be written to the optical storage medium (e.g., to an OPC area on the medium, or to other free space on the medium). At step 217, the instructions may be checked to determine whether the writing process is finished. If not, steps 212 through 217 may be repeated until an appropriate instruction is reached.

After the write portion of the calibration is finished, the reading and measurement portion of the calibration begins. Generally, steps 222 through 227 comprise a loop, wherein the data written in steps 212 through 217 is retrieved from the optical storage medium as a readback signal, and characteristics of the readback signal are analyzed with respect to the pattern data and/or instructions stored in the calibration bitstream. Thus, at step 222, one or more segments of the calibration bitstream (e.g., the same calibration bitstream used in steps 212 through 217) may be retrieved from the optical storage medium (e.g., the OPC area on the medium). At step 223, the instructions and corrected pattern data may be extracted from the bitstream in the same manner as in step 213. At step 224, the instructions are checked to determine whether the writing characteristics were changed before the corresponding pattern data was written to the optical storage medium. If so, at step 225, the characteristics of the readback signal that were read in previous iterations of the loop (e.g., at step 226 as described below) may be stored (and may be associated with the previously used write characteristic), and any analysis module may be reset to correlate any further readback signals with the new writing characteristic. In either case, at step 226 the next block of pattern data may be read from the optical storage medium (e.g., as a readback signal) and the signal may be analyzed with respect to the pattern data and/or instructions as extracted in step 223. For example, the characteristics of the readback signal may be analyzed to determine whether characteristics of the readback signal indicate an acceptable value for the most recently decoded write characteristic instruction(s).

At step 227, the instructions may be checked to determine whether the calibration process is finished. If not, steps 222, through 227 may be repeated until an appropriate instruction is reached. At step 230, after the final instruction is reached, an optimal write characteristic can be determined by finding the write characteristic that resulted in the most desirable characteristic(s) of the readback signal.

Thus, in a further embodiment, the writing step may further comprise changing a test value for the writing characteristic in response to at least one of the instructions, and writing some or all of the pattern data to the optical storage medium in accordance with the test value (see, e.g., steps 215 and 216 of flowchart 210). In another embodiment, the processing step may comprise comparing the readback signal to an expected signal based on the pattern data and correlating a characteristic of the readback signal with at least one of the instructions (see, e.g., steps 225 and 226).

In one exemplary method of analyzing the readback signal, the asymmetry between the baseline of at least one high frequency component of the readback signal and the baseline of at least one low frequency component of the readback signal may be measured for each value of the write characteristic. For example, various power levels of the write laser may result in more asymmetry or less asymmetry between these values. In one embodiment, the baselines are determined from a plurality of high frequency components and a plurality of low frequency components of the readback signal.

Figure 2C:
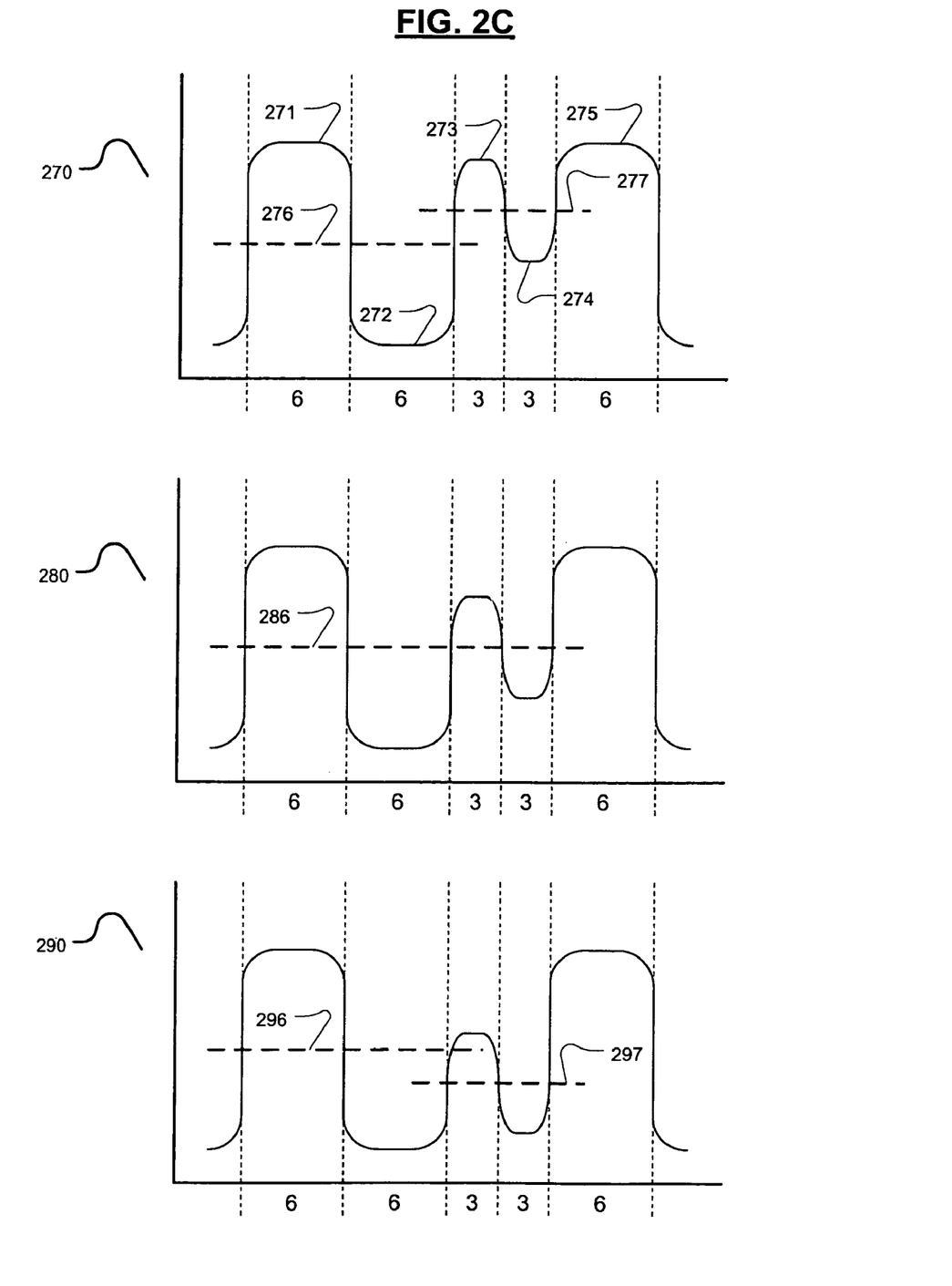
FIG. 2C is a diagram showing exemplary readback waveforms.

Referring now to FIG. 2C, asymmetries in these baselines for three different write power levels are shown. In each of the readback signals 270, 280, and 290, the reflectance of the optical storage medium is shown for regions of the medium containing a land of six bit periods (6 T) (e.g., 6 T land 271), followed by a 6 T pit (e.g., 6 T pit 272), a 3 T land (e.g., 3 T land 273), a 3 T pit (e.g., 3 T pit 274), and a 6 T land (e.g., 6 T land 277). The transitions from a 6 T pit to a 6 T land (or vice versa) may constitute relatively low frequency components of the readback signal. The transitions from a 3 T pit to a 3 T land (or vice versa) may constitute a relatively high frequency component of the readback signal. While the number of bit periods determining low and high frequency components may be selected empirically for a given system and/or application, in general, a high frequency component may comprise a sequence of at least two consecutive pits and lands, each having a period of $\leq 5$ T. In some embodiments, the high frequency component contains pits and lands having a period of 3 T or $\leq 4$ T. Similarly, in general, a low frequency component may comprise a sequence of at least two consecutive pits and lands, none of which has a high frequency component period. In various embodiments, the high frequency component contains pits and lands having a period of $\geq 4$ T, 5 T or 6 T.

The baseline of each of these components is generally the average of the high points of the component (e.g., the local maxima of the readback signal) and the low points of the component (e.g., the local minima of the readback signal). The difference between the baselines of the low frequency and high frequency components is the "asymmetry" of the readback signal. Thus, in readback signal 270, the low frequency component has baseline 276, and the high frequency component has a higher baseline 277. In readback signal 280, both components have baseline 286 (e.g., the asymmetry is at or near zero). In readback signal 290, the low frequency component has baseline 296, and the high frequency component has a lower baseline 297. Therefore, the write power level that resulted in readback signal 280 has the lowest asymmetry of the three examples in FIG. 2C, and that write power level is generally considered to be the "optimal" write characteristic for the optical storage medium.

Thus, in a further embodiment, the method may comprise correlating the characteristic of the readback signal with one or more run lengths in the pattern data (e.g., with 6 T runlengths and 3 T runlengths, as shown in FIG. 2C). In a still further embodiment, the characteristic of the readback signal may comprise asymmetry between a baseline of at least one high frequency component of the readback signal (e.g., baseline 277 of FIG. 2C) and a baseline of at least one low frequency component of the readback signal (e.g., baseline 276 of FIG. 2C).

The determining step may comprise selecting an optimal value of the writing characteristic based on a test value that correlates to a lowest asymmetry between the baselines (e.g., determine which write power level resulted in readback signal 280). It will be recognized that once an optimal value of the writing characteristic has been determined, the method may further comprise writing data to the optical storage medium in accordance with the determined value of the writing characteristic.

In one embodiment, the method comprises an optimal power calibration (OPC) method, so that the writing characteristic to be tested is the writing power level. However, it will be recognized that the inventive concepts presented herein are not limited to calibrating the write power level, and the present methods may be adapted for testing other writing characteristics, such as timing compensation (e.g., for the write strategy).

In another embodiment, the method may be used to measure a timing phase error. Whenever there is a transition in the readback signal (e.g., the value of the signal switches from mark to space or space to mark, where marks and spaces represent binary values in the optical storage medium) the value of the signal will cross a zero line. When the signal crosses the zero line early or late, this is a timing phase error. It is desirable to determine an optimal timing phase offset for writing, so that the timing phase error on readback can be minimized. For example, the method may comprise measuring a plurality of timing phase errors in the readback signal, and selecting a timing phase offset that results in the lowest measured timing phase error. Thus, in a further embodiment the determining step comprises selecting an optimal timing phase offset.

The timing phase error may vary depending on the run-length of the values before and after the transition. For example, the timing phase error for a 3 T mark following by a 6 T space may be different than the timing phase error for a 5 T space following by a 4 T mark. Therefore, it is desirable to determine the optimal timing phase offset for each transition type, where there is a transition type for each combination of transitions between one run-length of marks followed by another run-length of spaces, and vice-versa. For example, if the maximum run-length of the encoding system is 10, then 200 different optimal timing phase offsets may be required (because there are 100 combinations of run lengths possible, and two different transition directions [e.g., "mark" to "space" and "space" to "mark"] are possible). Therefore, in another embodiment the determining step comprises selecting an optimal timing phase offset for each transition type in said pattern data. The optimal timing phase offset may then be used when writing data to the disk to adjust the timing of transitions (e.g., to turn the write laser on and off at the optimal time).

In a further embodiment, the processing step further comprises storing to memory a timing phase error value for each transition in said pattern data. To determine the optimal timing phase offset for writing, these stored values may be processed to determine a mean timing phase error for each transition type. For example, when processing the stored value to determine optimal writing characteristics, both the pattern data and the stored timing phase error values may be read from memory. Thus, the timing phase error values can be correlated with the transition type, and a histogram of timing phase errors for each transition type can be created. The histogram can be analyzed to determine the optimal timing phase offset for writing each transition type. In addition, the data can provide valuable insight into writing characteristics such as jitter (e.g., when there is statistically significant variation in the timing phase error for a transition type). A person skilled in the art can select pattern data to gather the most necessary information. For example, the pattern data may contain a relatively large number of high frequency transitions and a relatively low number of low frequency transitions, because high frequency transitions are more commonly written.

In a preferred embodiment, the storing step comprises encoding the timing phase error values before storing them. Thus, the memory bandwidth can be optimized so that more data can be gathered and analyzed during the OPC process, resulting in more accurate measurement. In one embodiment, the storing step comprises encoding said timing phase error values such that an insignificant timing phase error value occupies one binary bit in said memory, and significant timing phase error values occupy at least three binary bits in said memory. Thus, when the timing phase error is zero (or close to zero), then only one bit of data is necessary to store the data. It is expected that the timing phase error is usually insignificant, so that this strategy saves significant memory and bandwidth.

In one exemplary embodiment, six bits of data are used for each significant timing phase error value. The first bit of each value may be 0 to indicate that the error value was insignificant, or 1 to indicate that the error value is significant. When this first bit is 1, the following five bits may store a signed integer (e.g., decimal values of −16 to 15). When the first bit is 0, the following bit will begin a new error value.

In a further embodiment, the timing phase error values may be packed into data words (e.g., 32 or 64 bits that may be stored to memory in a single operation). The values may be packed so that no timing phase error value occupies more than one word (e.g., so that a timing phase error value does not begin at the end of one data word, and end at the beginning of a second data word). In this implementation, if there are fewer than five bits remaining in a word, a "1" will indicate that the remainder of the word is unused, and that the next timing phase error value is significant, and will be found in the following word. Thus, when analyzing the stored timing phase error values only one word at a time needs to be retrieved in order to extract all of the timing phase error values in that word.

An Exemplary Method for Encoding

The present invention further relates to a method for encoding pattern data and instructions for calibration of a writing characteristic for writing data to an optical storage medium. At least one of the instructions generally comprises an instruction for setting a test value for the writing characteristic. The method generally includes the steps (a) encoding the pattern data according to a run length limited (RLL) constraint, and (b) producing a bitstream comprising the pattern data and the instructions, wherein the step of producing comprises encoding the instructions in violation of the constraint.

The step of encoding the pattern data may further comprise encoding the pattern data according to the encoding standard of the optical storage medium (e.g., EFM encoding for CDs, EFMPlus encoding for DVDs, etc.). In one exemplary embodiment, the writing characteristic to be calibrated may be a writing power level. It will be recognized that the present encoding may also include instructions for testing other writing characteristics, such as timing compensation.

Referring now to FIG. 2A, an exemplary calibration bitstream is shown using an EFM encoding. As shown in FIG. 1, the 8-bit binary value for the number 136 may be represented by binary sequence 101 (e.g., "10001000" in an eight-bit binary code), binary sequence 102 representing an EFM code for the same byte of data (e.g., "01001001000001"), and/or binary sequence 103 representing the same EFM code, except that a "1" in binary sequence 102 is represented in binary sequence 103 as a transition between a "1" and a "0" or between a "0" and a "1," corresponding to the pit and land transitions to be written to disc (e.g., "0111000111111110"). Thus, the binary sequence represents an EFM pattern that conforms to a run length limited (RLL) constraint. Calibration instructions can be superimposed on (or embedded into or interleaved with) pattern data 103 to produce calibration bitstream 200. Calibration bitstream 200 literally violates the run length constraint of EFM coding (see, e.g., bit 201 and bit 202). Therefore, a decoder receiving or otherwise operating on bitstream 200 may be configured to recognize violations 201 and 202 of the run length constraint, and produce both corrected pattern data (e.g., pattern data that conforms to the run length constraint and which is suitable for writing to an optical storage medium) and instructions corresponding to the violation(s) of the constraint. One way to encode the instructions may be to map the number of violations in a sequence to a particular instruction. A person skilled in the art will be able to implement a variety of other encoding techniques based on this invention.

Exemplary Software

The present invention also includes algorithms, computer programs, and/or software, implementable and/or executable in or by an apparatus containing a microcontroller, microprocessor or other instruction processor (e.g., a general purpose computer or workstation equipped with a conventional analog and/or digital signal processor), configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD (e.g., CD-ROM, CD-R, CD-RW, etc.), DVD (e.g., DVD-ROM, DVD-R, DVD+R, DVD-RW, DVD+RW, etc.), magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device, or application-specific [integrated] circuit).

In various embodiments, the computer-readable medium or waveform comprises at least one instruction to receiving calibration instructions and pattern data, wherein the instructions are synchronized with the pattern data (e.g., where both calibration instructions and pattern data are encoded in a single bitstream, or where the calibration instructions and pattern data have been previously extracted from such a bitstream). The waveform or medium may further include instructions to write the pattern data to the optical storage medium in accordance with the calibration instructions, and to read a readback signal corresponding to the pattern data from the optical storage medium. In addition, the waveform or medium may include the instructions necessary to processing the readback signal in accordance with the calibration instructions, and/or to determine a writing characteristic for the optical storage medium based at least in part on the readback signal, in accordance with the methods disclosed herein.

In another embodiment, the computer-readable medium or waveform may comprise instructions for encoding pattern data and calibration instructions for calibrating a writing characteristic for writing data to an optical storage medium. At least one of the calibration instructions generally comprises an instruction for setting a test value for the writing characteristic. The computer-readable medium or waveform may include instructions for (a) encoding the pattern data according to a run length limited (RLL) constraint, and (b) producing a bitstream comprising the pattern data and the calibration instructions by encoding the calibration instructions in violation of the run length constraint of the pattern data.

An Exemplary Apparatus

In another aspect, the present invention relates to an apparatus for writing data to an optical storage medium. The apparatus may comprise (a) a memory configured to produce a calibration bitstream, (b) a decoding module configured to extract calibration pattern data and calibration instructions synchronized with the calibration pattern data from the calibration bitstream (c) a writing module configured to write the calibration pattern data to the optical storage medium in accordance with the calibration instructions, (d) a reading module configured to read a readback signal corresponding to the calibration pattern data from the optical storage medium, and (e) a processing module configured to process the readback signal in accordance with the calibration instructions and determine an optimal value of a writing characteristic for the optical storage medium based at least in part on the readback signal.

Thus, in an alternative embodiment the apparatus may comprise (a) means for producing a calibration bitstream, (b) means for extracting the calibration pattern data and calibration instructions from the calibration bitstream, (c) means for writing the calibration pattern data to the optical storage medium in accordance with the calibration instructions, (d) means for reading a readback signal corresponding to the calibration pattern data from the optical storage medium, (e) means for processing the readback signal in accordance with the calibration instructions, and (f) means for determining an optimal value of a writing characteristic for the optical storage medium based at least in part on the readback signal.

Figure 3:
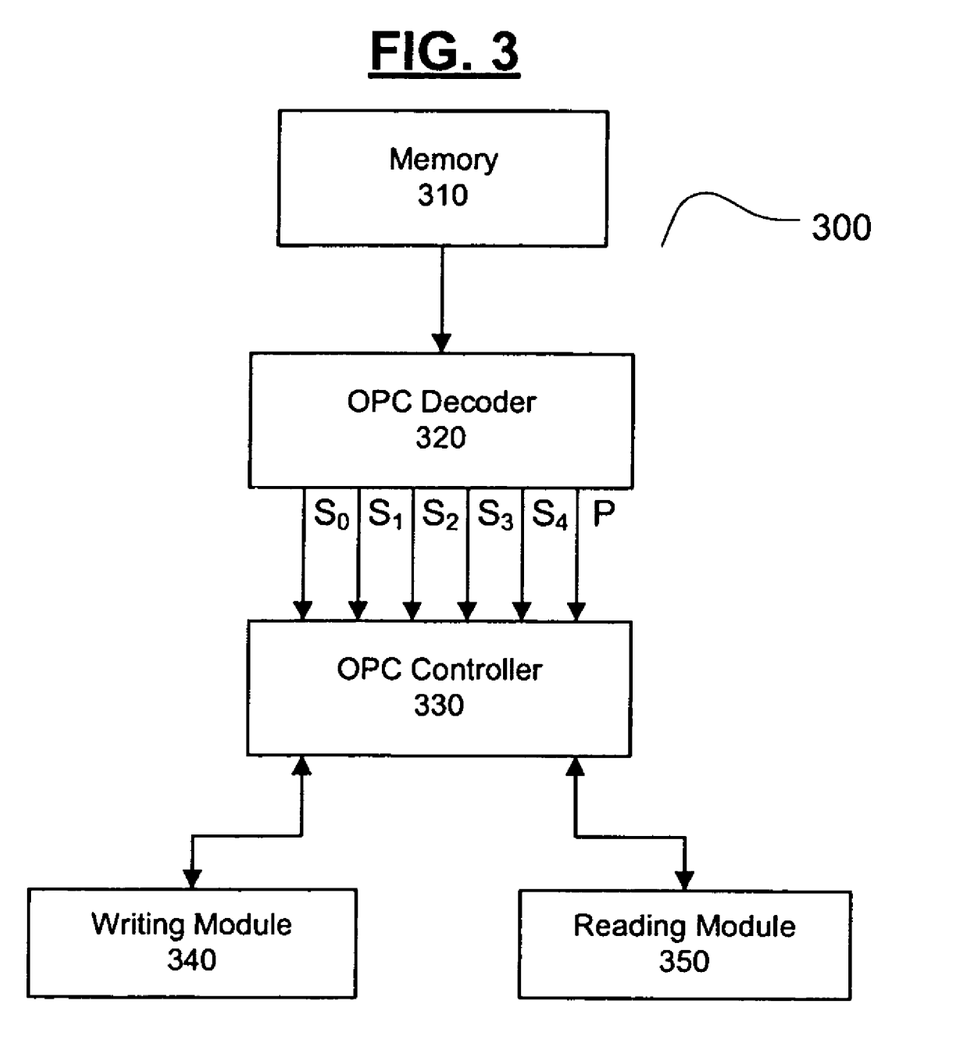
FIG. 3 is a diagram showing an exemplary apparatus according to the present invention.

Referring now to FIG. 3, an exemplary embodiment is shown. Memory 310 is generally configured to store data corresponding to a calibration bitstream. Memory 310 may comprise random access memory (RAM), low latency non-volatile memory such as flash memory, read only memory (ROM), and/or other suitable electronic data storage. Memory 310 generally provides the calibration bitstream to OPC decoder 320 (e.g., via a parallel data bus and/or a serial communications channel).

OPC decoder 320 is generally configured to extract calibration pattern data and calibration instructions from the calibration bitstream. In a preferred embodiment, the calibration bitstream may be encoded as described above and as shown in FIG. 2A, wherein the run length limited pattern data has instructions superimposed on it by encoding violations of the run length constraint. Thus, the calibration instructions may be substantially synchronized with the calibration pattern data. Therefore, OPC decoder 320 may provide a plurality of output signals $S_0$ through $S_4$ corresponding to instructions encoded with the pattern data, as well as signal P corresponding to the pattern data (where the run length violations have been removed from the pattern data P). A person skilled in the art will recognize that OPC decoder 320 may be efficiently implemented with dedicated circuitry [e.g., in an application specific integrated circuit, or in a functional circuit block within a larger integrated circuit receiving and/or processing data from memory 310 or from a larger memory containing memory 310], but may also be implemented in software for a microcontroller or microprocessor.

OPC controller 330 may receive signals $S_0$ through $S_4$ and pattern data P, and control write module 340 and read module 350 to determine an optimal write characteristic using the instructions and pattern data. OPC controller 330 may, with write module 340, perform steps 214 through 217 of flowchart 210. Furthermore, OPC controller 330 may, with read module 340, perform steps 224 through 230 of flowchart 210.

In another embodiment, the calibration instructions may be superimposed on (or embedded into or interleaved with) the calibration pattern data in the calibration bitstream. In a further embodiment, the calibration pattern data may conform to a run length limited constraint, and the decoding module may be further configured to extract the calibration instructions and the calibration pattern data by locating violations of the constraint in the calibration bitstream (e.g., the calibration bitstream may be encoded as described above and as shown in FIG. 2A). Thus, in another embodiment, the apparatus may further comprise means for extracting the calibration instructions and the calibration pattern data by locating violations of the constraint in the calibration bitstream. In a preferred embodiment, the calibration pattern data may comprise data encoded according to the encoding standard of the optical storage medium, such as eight-to-fourteen modulation (EFM) encoded data for CDs.

In yet another embodiment, the writing module may be further configured to change a test value of the writing characteristic in response to at least one of the calibration instructions and to write some or all of the pattern data to the optical storage medium in accordance with the test value. Thus, in another embodiment the apparatus may comprise means for changing a test value of the writing characteristic in response to at least one of the calibration instructions and means for writing some or all of the pattern data to the optical storage medium in accordance with the test value.

In still another embodiment, the processing module may be further configured to compare the readback signal to an expected signal based on the calibration pattern data, and to correlate a characteristic of the readback signal with at least one of the calibration instructions. Thus, in another embodiment the apparatus may comprise means for comparing the readback signal to an expected signal based on the calibration pattern data and means for correlating a characteristic of the readback signal with at least one of the calibration instructions. In further embodiment, the processing module may be further configured to correlate the characteristic of the readback signal with one or more run lengths in the calibration pattern data. Thus, in another embodiment, the apparatus may comprise means for correlating the characteristic of the readback signal with one or more run lengths in the calibration pattern data.

In a preferred embodiment, the characteristic of the readback signal is asymmetry between a baseline of one or more high frequency components of the readback signal and a baseline of one or more low frequency components of the readback signal (see, e.g., the baseline asymmetries of readback signals 270, 280, and 290 of FIG. 2C, as described above). In a further embodiment, the processing module may be further configured to determine the optimal value of the tested write characteristic based on the test value that correlates to a lowest asymmetry between the baselines. Thus, the apparatus may include means for storing asymmetry values for at least one previous test value (e.g., storing asymmetry values for all of the previous test values, or simply storing the lowest asymmetry value so far encountered and the corresponding test value). The apparatus may further include means for determining the optimal value of the tested write characteristic based on the test value that correlates to a lowest asymmetry between the baselines.

In one embodiment, the writing characteristic to be tested is the writing power level. In another embodiment, the characteristic of the readback signal comprises timing phase error.

Thus, in another embodiment the processing module is further configured to determine an optimal timing phase offset. In a further embodiment, the processing module is further configured to determine an optimal timing phase offset for each transition type in the pattern data, where there is a transition type for each combination of transitions between one run-length of marks followed by another run-length of spaces, and vice-versa.

In another embodiment, the processing module is further configured to store to the memory a timing phase error value for each transition in the pattern data. In a further embodiment, the processing module is further configured to encode the timing phase error values such that an insignificant timing phase error value occupies one binary bit in the memory, and significant timing phase error values occupy at least three binary bits in the memory (as described above).

It will be recognized that in an optimal power calibration (OPC) apparatus it may be desirable to determine both writing characteristics. Furthermore, the methods and apparatus of the present invention may be used to determine additional writing characteristics, either sequentially or simultaneously with the writing characteristics presented herein.

The optical storage medium may comprise an optical disc such as a write-once optical disc (e.g., a CD-R, DVD-R, or DVD+R) or a rewritable optical disc (e.g., a DVD-RW, DVD+RW, or DVD-RAM).

The System

Figure 4A:
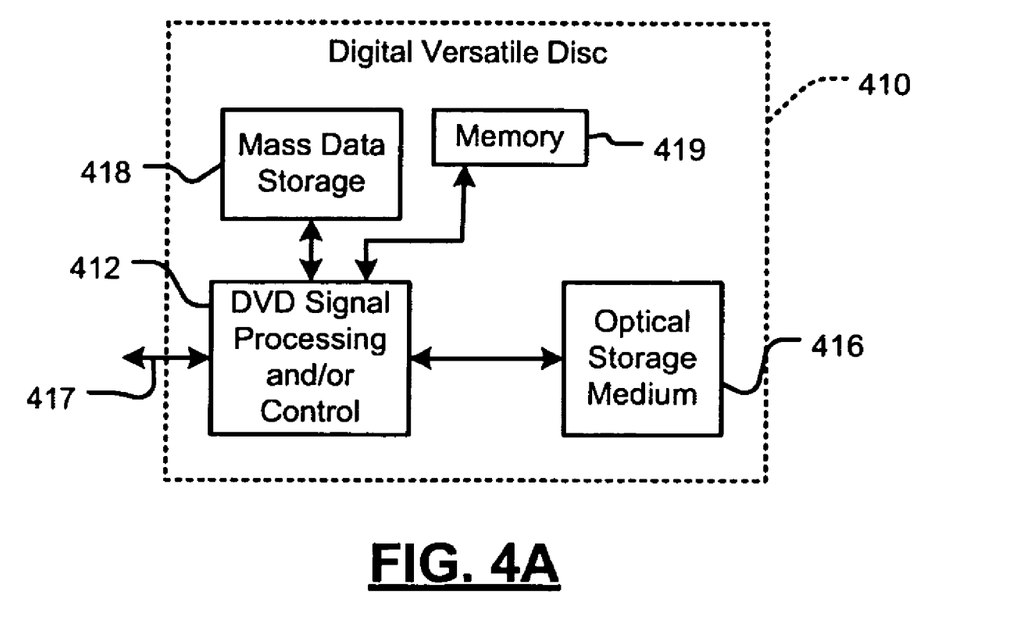
FIG. 4A is a diagram of an exemplary digital versatile disc (DVD) player.

Referring now to FIG. 4A, the present invention can be implemented in a digital versatile disc (DVD) drive 410. For example, the present invention may be implemented in mass data storage of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may be connected to memory 419 such as RAM, ROM, low latency nonvolatile memory such as flash memory and/or other suitable electronic data storage.

Figure 4B:
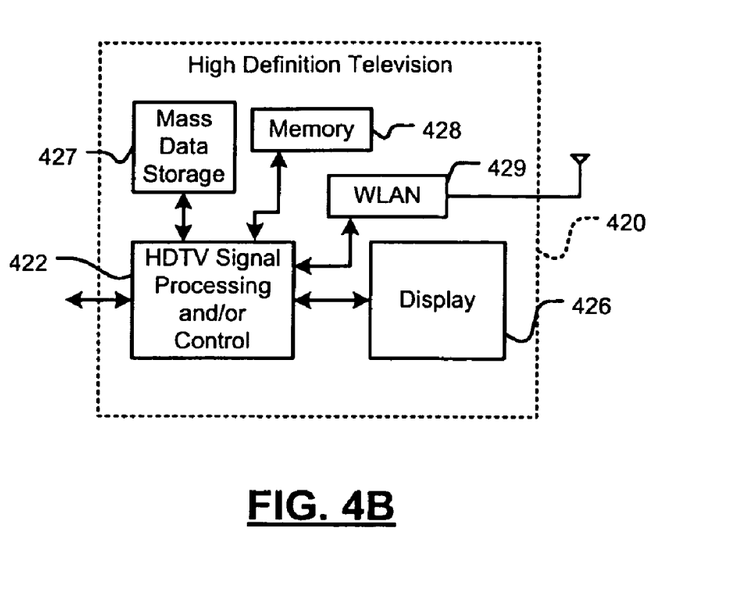
FIG. 4B is a diagram of an exemplary high definition television (HDTV).

Referring now to FIG. 4B, the present invention can be implemented in a high definition television (HDTV) 420. The present invention may be implemented in mass data storage of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one DVD may have the configuration shown in FIG. 4A. The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 4C:
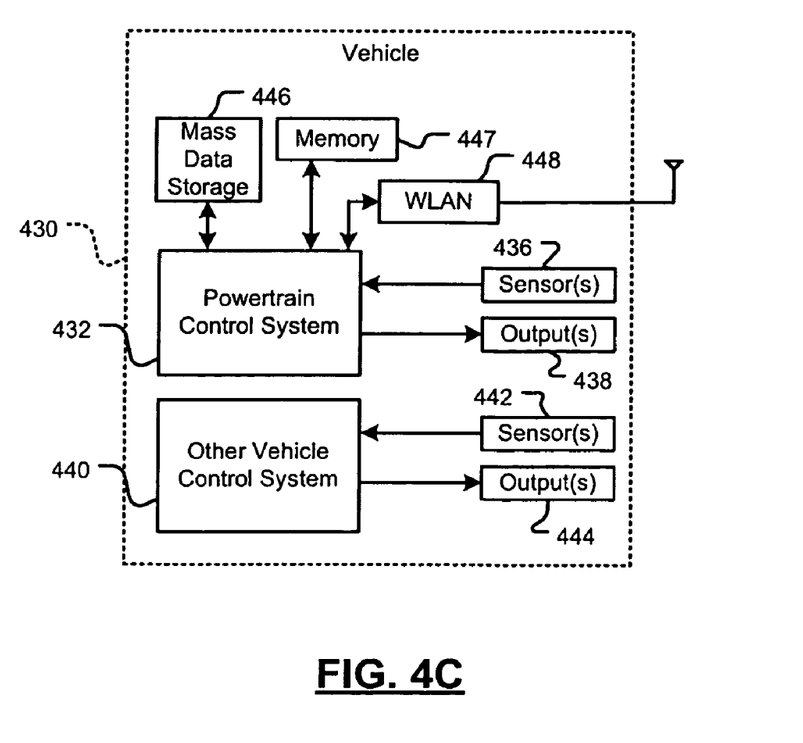
FIG. 4C is a diagram of an exemplary vehicle control system.

Referring now to FIG. 4C, the present invention can be implemented in a control system of a vehicle 430. For example, the present invention may be implemented in mass data storage of the vehicle control system 430. In some implementations, the vehicle control system includes a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices (for example, hard disk drives [HDDs] and/or DVDs). At least one DVD may have the configuration shown in FIG. 4A. The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 4D:
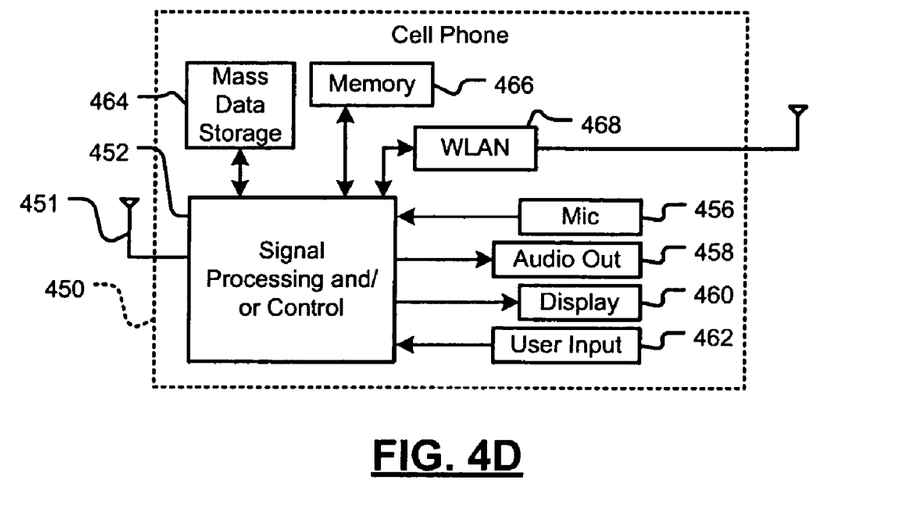
FIG. 4D is a diagram of an exemplary cellular or mobile phone.

Referring now to FIG. 4D, the present invention can be implemented in a cellular phone 450 that may include a cellular antenna 451. For example, the present invention may be implemented in mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices (for example, hard disk drives [HDDs] and/or DVDS). At least one DVD may have the configuration shown in FIG. 4A. The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 4E:
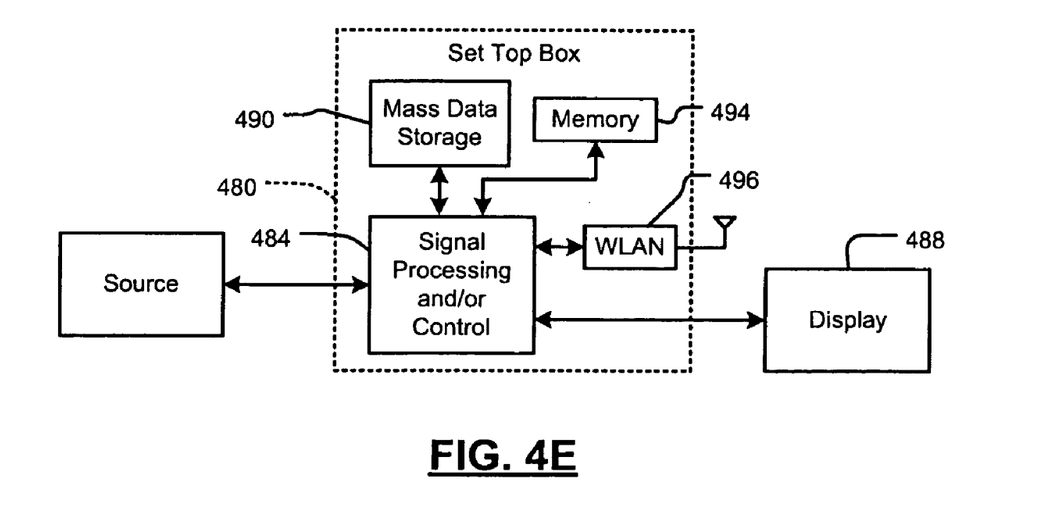
FIG. 4E is a diagram of an exemplary television set top box.

Referring now to FIG. 4E, the present invention can be implemented in a set top box 480. For example, the present invention may be implemented in mass data storage of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices (for example, hard disk drives [HDDs] and/or DVDs). At least one DVD may have the configuration shown in FIG. 4A. The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 4F:
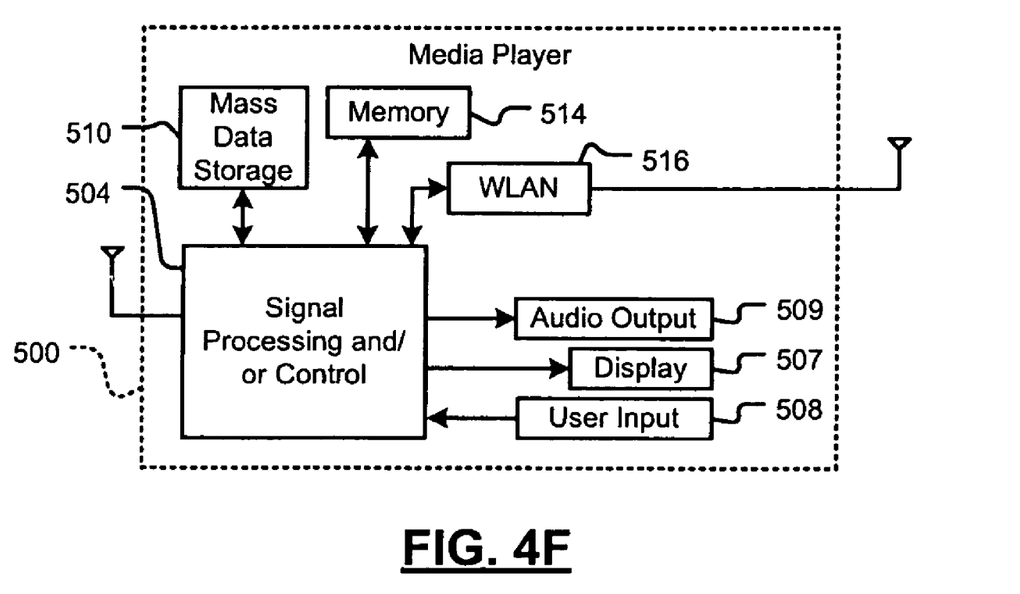
FIG. 4F is a diagram of an exemplary portable media player.

Referring now to FIG. 4F, the present invention can be implemented in a media player 500. For example, the present invention may be implemented in mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one DVD may have the configuration shown in FIG. 4A. The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

CONCLUSION/SUMMARY

Thus, the present invention provides methods, software, and apparatus for the calibration of writing characteristics for writing to an optical storage medium, and methods of encoding calibration pattern data and calibration instructions. The present invention advantageously provides the ability to flexibly set test parameters and to quickly and accurately test the write characteristics of a recordable or re-writable optical storage medium.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of calibration for writing to an optical storage medium, said method comprising:
    receiving pattern data and instructions synchronized with said pattern data;
    writing said pattern data to said optical storage medium in accordance with said instructions, wherein said writing comprises (i) changing a test value for a writing characteristic in response to at least one of said instructions and (ii) writing some or all of said pattern data to said optical storage medium in accordance with said test value;

reading a readback signal corresponding to said pattern data from said optical storage medium;

processing said readback signal in accordance with said instructions, wherein said processing comprises (i) comparing said readback signal to an expected signal based on said pattern data, and (ii) correlating a characteristic of said readback signal with (a) at least one of said instructions and (b) one or more run lengths in said pattern data; and determining a value of a writing characteristic for writing data to said optical storage medium based at least in part on said readback signal.

2. The method of claim 1, wherein said receiving comprises receiving a bitstream comprising (i) said instructions and (ii) said pattern data.

3. The method of claim 2, wherein said bitstream comprises said instructions superimposed on said pattern data.

4. The method of claim 3, wherein said receiving further comprises extracting said pattern data and said instructions from said bitstream.

5. The method of claim 3, wherein said pattern data conforms to a run length limited constraint, and said bitstream comprises said instructions encoded in violation of said run length limited constraint.

6. The method of claim 1, wherein said pattern data comprises data encoded according to an encoding standard of said optical storage medium.

7. The method of claim 1, wherein said characteristic of said readback signal comprises asymmetry between (i) a baseline of at least one high frequency component of said readback signal and (ii) a baseline of at least one low frequency component of said readback signal.

8. The method of claim 7, wherein said determining comprises selecting an optimal value of said writing characteristic based on a test value that correlates to a lowest asymmetry between said baselines.

9. The method of claim 1, wherein said writing characteristic comprises a writing power level.

10. The method of claim 1, wherein said characteristic of said readback signal comprises timing phase error.

11. The method of claim 10, wherein said determining comprises selecting an optimal timing phase offset.

12. The method of claim 10, wherein said determining comprises selecting an optimal timing phase offset for each transition type in said pattern data.

13. The method of claim 10, wherein said processing further comprises storing to memory a timing phase error value for each transition in said pattern data.

14. The method of claim 1, wherein said optical storage medium comprises an optical disc.

15. The method of claim 14, wherein said optical disc comprises a write-once optical disc.

16. The method of claim 14, wherein said optical disc comprises a rewritable optical disc.

17. The method of claim 1, further comprising writing data to said optical storage medium in accordance with said determined value.

18. A non-transitory computer readable medium having stored thereon a computer program or waveform containing a set of instructions which, when executed by a processing device configured to execute computer-readable instructions, is configured to perform the method of claim 1.

19. A method for encoding pattern data and instructions for calibration of a writing characteristic for writing data to an optical storage medium, wherein at least one of said instructions comprises an instruction for setting a test value for said writing characteristic, said method comprising the step of encoding said pattern data according to a run length limited (RLL) constraint; and producing a bitstream comprising said pattern data and said instructions, wherein said step of producing comprises encoding said instructions within violations of said constraint.

20. The method of claim 19, wherein said step of encoding said pattern data further comprises encoding said pattern data according to an encoding standard of said optical storage medium.

21. The method of claim 19, wherein said writing characteristic comprises a writing power level.

22. The method of claim 19, wherein said writing characteristic comprises a timing phase offset.

23. An apparatus for writing data to an optical storage medium, said apparatus comprising:

a memory configured to produce a calibration bitstream;

a decoding module configured to extract calibration pattern data and calibration instructions synchronized with said calibration pattern data from said calibration bitstream;

a writing module configured to write said calibration pattern data to said optical storage medium in accordance with said calibration instructions;

a reading module configured to read a readback signal corresponding to said calibration pattern data from said optical storage medium; and a processing module configured to process said readback signal in accordance with said calibration instructions and determine an optimal value of a writing characteristic for said optical storage medium based at least in part on said readback signal.

24. The apparatus of claim 23, wherein said calibration instructions are superimposed on said calibration pattern data in said calibration bitstream.

25. The apparatus of claim 24, wherein said calibration pattern data conforms to a run length limited constraint, and said decoding module is further configured to extract said calibration instructions and said calibration pattern data by locating violations of said constraint in said calibration bitstream.

26. The apparatus of claim 23, wherein said calibration pattern data comprises data encoded according to an encoding standard of said optical storage medium.

27. The apparatus of claim 23, wherein said writing module is further configured to change a test value of said writing characteristic in response to at least one of said calibration instructions and to write some or all of said pattern data to said optical storage medium in accordance with said test value.

28. The apparatus of claim 27, wherein said processing module is further configured to compare said readback signal to an expected signal based on said calibration pattern data.

29. The apparatus of claim 28, wherein said processing module is further configured to correlate a characteristic of said readback signal with at least one of said calibration instructions.

30. The apparatus of claim 28, wherein said processing module is further configured to correlate a characteristic of said readback signal with one or more run lengths in said calibration pattern data.

31. The apparatus of claim 30, wherein said characteristic of said readback signal comprises asymmetry between a baseline of high frequency components of said readback signal and a baseline of low frequency components of said readback signal.

32. The apparatus of claim 31, wherein said processing module is further configured to determine said optimal value based on a test value that correlates to a lowest asymmetry between said baselines.

33. The apparatus of claim 28, wherein said writing characteristic comprises a writing power level.

34. The apparatus of claim 28, wherein said characteristic of said readback signal comprises timing phase error.

35. The apparatus of claim 34, wherein said processing module is further configured to determine an optimal timing phase offset.

36. The apparatus of claim 34, wherein said processing module is further configured to determine an optimal timing phase offset for each transition type in said pattern data.

37. The apparatus of claim 34, wherein said processing module is further configured to store to said memory a timing phase error value for each transition in said pattern data.

38. The apparatus of claim 37, wherein said processing module is further configured to encode said timing phase error values such that an insignificant timing phase error value occupies one binary bit in said memory, and significant timing phase error values occupy at least three binary bits in said memory.

39. The apparatus of claim 23, wherein said optical storage medium comprises an optical disc.

40. The apparatus of claim 39, wherein said optical disc comprises a write-once optical disc.

41. The apparatus of claim 39, wherein said optical disc comprises a rewritable optical disc.

42. A method of calibration for writing to an optical storage medium, said method comprising:
  receiving a bitstream comprising (i) pattern data and (ii) instructions superimposed on said pattern data, wherein said instructions are synchronized with said pattern data, said pattern data conforms to a run length limited constraint, and said instructions are encoded in violation of said run length limited constraint;
  writing said pattern data to said optical storage medium in accordance with said instructions;
  reading a readback signal corresponding to said pattern data from said optical storage medium;
  processing said readback signal in accordance with said instructions; and
  determining a value of a writing characteristic for writing data to said optical storage medium based at least in part on said readback signal.

43. A method of calibration for writing to an optical storage medium, said method comprising:
  receiving pattern data and instructions synchronized with said pattern data;
  writing said pattern data to said optical storage medium in accordance with said instructions, wherein said writing comprises (i) changing a test value for a writing characteristic in response to at least one of said instructions and (ii) writing some or all of said pattern data to said optical storage medium in accordance with said test value;
  reading a readback signal corresponding to said pattern data from said optical storage medium, said readback signal comprising a timing phase error;
  processing said readback signal in accordance with said instructions, wherein said processing comprises (i) comparing said readback signal to an expected signal based on said pattern data and (ii) correlating a characteristic of said readback signal with at least one of said instructions; and
  determining a value of a writing characteristic for writing data to said optical storage medium based at least in part on said readback signal, wherein said determining comprises selecting an optimal timing phase offset for each transition type in said pattern data.

44. A method of calibration for writing to an optical storage medium, said method comprising:
  receiving pattern data and instructions synchronized with said pattern data;
  writing said pattern data to said optical storage medium in accordance with said instructions, wherein said writing comprises (i) changing a test value for a writing characteristic in response to at least one of said instructions and (ii) writing some or all of said pattern data to said optical storage medium in accordance with said test value;
  reading a readback signal corresponding to said pattern data from said optical storage medium, said readback signal comprising a timing phase error;
  processing said readback signal in accordance with said instructions, wherein said processing comprises (i) comparing said readback signal to an expected signal based on said pattern data, (ii) storing to memory a timing phase error value for each transition in said pattern data, and (iii) correlating a characteristic of said readback signal with at least one of said instructions; and
  determining a value of a writing characteristic for writing data to said optical storage medium based at least in part on said readback signal.

45. The method of claim 42, wherein said writing further comprises (i) changing a test value for said writing characteristic in response to at least one of said instructions, and (ii) writing some or all of said pattern data to said optical storage medium in accordance with said test value.

46. The method of claim 45, wherein said processing comprises comparing said readback signal to an expected signal based on said pattern data.

47. The method of claim 46, wherein said processing further comprises correlating a characteristic of said readback signal with at least one of said instructions.

48. The method of claim 47, further comprising correlating said characteristic of said readback signal with one or more run lengths in said pattern data.

49. The method of claim 44, wherein said storing comprises encoding said timing phase error values such that (i) an insignificant timing phase error value occupies one binary bit in said memory, and (ii) significant timing phase error values occupy at least three binary bits in said memory.

* * * * *